United States Patent
Agarwal et al.

(10) Patent No.: US 9,619,360 B2
(45) Date of Patent: *Apr. 11, 2017

(54) CODE PROFILING OF EXECUTABLE LIBRARY FOR PIPELINE PARALLELIZATION

(71) Applicant: International Business Machines Corporation, Armonk, NY (US)

(72) Inventors: Shivali Agarwal, Uttar Pradesh (IN); Monika Gupta, New Delhi (IN); Naga Praveen Kumar Katta, Rajahmundry (IN)

(73) Assignee: International Business Machines Corporation, Armonk, NY (US)

( * ) Notice: Subject to any disclaimer, the term of this patent is extended or adjusted under 35 U.S.C. 154(b) by 383 days.

This patent is subject to a terminal disclaimer.

(21) Appl. No.: 14/479,455

(22) Filed: Sep. 8, 2014

(65) Prior Publication Data

US 2015/0067663 A1 Mar. 5, 2015

Related U.S. Application Data

(63) Continuation of application No. 13/446,089, filed on Apr. 13, 2012, now Pat. No. 8,910,137.

(51) Int. Cl.
| | | |
|---|---|---|
| *G06F 9/44* | (2006.01) | |
| *G06F 11/34* | (2006.01) | |
| *G06F 9/45* | (2006.01) | |

(52) U.S. Cl.
CPC ........ *G06F 11/3466* (2013.01); *G06F 8/4452* (2013.01); *G06F 8/45* (2013.01);
(Continued)

(58) Field of Classification Search
CPC ............. G06F 11/3466; G06F 8/452; G06F 2201/865; G06F 8/30; G06F 8/4452; G06F 8/45; G06F 8/72
(Continued)

(56) References Cited

U.S. PATENT DOCUMENTS

| | | |
|---|---|---|
| 7,530,069 B2 | 5/2009 | Kawahara et al. |
| 8,910,137 B2 | 12/2014 | Agarwal et al. |

(Continued)

OTHER PUBLICATIONS

Notice of Allowance for U.S. Appl No. 13/409,536, filed Mar. 1, 2012.
(Continued)

*Primary Examiner* — Hang Pan
*Assistant Examiner* — Hui-Wen Lin
(74) *Attorney, Agent, or Firm* — Schmeiser, Olsen & Watts, LLP; John Pivnichny

(57) ABSTRACT

A method and system for creating a library method stub in source code form corresponding to an original library call in machine-executable form. The library method stub is created in a predefined programming language by use of a library method signature associated with the original library call, at least one idiom sentence, and a call invoking the original library call. Creating the library method stub includes composing source code of the library method stub by matching the at least one idiom sentence with idiom-stub mappings predefined for each basic idiom of at least one basic idiom. The original library call appears in sequential code. The library method signature specifies formal arguments of the original library call. The at least one idiom sentence summarizes memory operations performed by the original library call on the formal arguments. The created library method stub is stored in a database.

16 Claims, 6 Drawing Sheets

(52) U.S. Cl.
CPC ............... *G06F 8/452* (2013.01); *G06F 8/72* (2013.01); *G06F 8/30* (2013.01); *G06F 2201/865* (2013.01)

(58) Field of Classification Search
USPC ........................................................ 717/163
See application file for complete search history.

(56) References Cited

U.S. PATENT DOCUMENTS

| | | | |
|---|---|---|---|
| 8,949,809 B2 | 2/2015 | Varma et al. | |
| 2002/0083416 A1* | 6/2002 | Click, Jr. ................. | G06F 8/30 717/120 |
| 2005/0172299 A1* | 8/2005 | Zhao ....................... | G06F 9/541 719/313 |
| 2005/0188364 A1* | 8/2005 | Cockx ..................... | G06F 8/456 717/159 |
| 2007/0169057 A1 | 7/2007 | Silvera et al. | |
| 2008/0098208 A1 | 4/2008 | Reid et al. | |
| 2008/0127146 A1* | 5/2008 | Liao ........................ | G06F 8/456 717/150 |
| 2009/0077545 A1 | 3/2009 | Silvera et al. | |
| 2009/0288075 A1 | 11/2009 | Song et al. | |
| 2010/0199257 A1 | 8/2010 | Biggerstaff | |
| 2010/0257516 A1 | 10/2010 | Roediger et al. | |
| 2010/0274972 A1 | 10/2010 | Babayan et al. | |
| 2010/0281489 A1 | 11/2010 | Lee et al. | |
| 2010/0306736 A1 | 12/2010 | Bordelon et al. | |
| 2010/0306753 A1 | 12/2010 | Yi et al. | |
| 2012/0144376 A1 | 6/2012 | Van Eijndhoven et al. | |
| 2013/0125097 A1 | 5/2013 | Ebcioglu et al. | |

OTHER PUBLICATIONS

Ceng, et al.; MAPS: An Integrated Framework for MPSoC Application Parallelization; DAC 2008, Jun. 8-13, 2008, Anaheim, California, USA; pp. 754-759.
Curry, Timothy W.; Profiling and Tracing Dynamic Library Usage Via Interposition; Sun Microsystems, Inc.; 12 pages.
Dia, et al.; Automatically Partitioning Packet Processing Applications for Pipelined Architectures; PLDI '05, Jun. 12-15, 2005; Chicago, Illinois, USA; pp. 237-248.
Dig, et al.; ReLooper: Refactoring for Loop Parallelism in Java; OOOPSLA '09, Oct. 25-29, 2009, Orlando, Florida, USA; 2 pages.
Edison Design Group; C++ Front End; Internal Documentation (excerpt); Mar. 17, 2011 (Version 4.3); West Orange, New Jersey; 122 pages.
Gordon, et al.; A Stream Complier for Communication-Exposed Architectures;ASPLOS X 10/02, San Jose, CA, USA pp. 291-303.
Huang, et al.; Decoupled Software Pipelining Creates Parallelization Opportunities; CGO '10, Apr. 24-28, 2010, Toronto, Ontario, Canada; 2010; pp. 121-130.
Huang, Chin; CPROTO(1) Manual Page; http://bima.astro.umd.edu/nemo/man_html/cproto.I.html; retrieved from the Internet Jun. 14, 2011.
Jouvelot, et al.; Algebraic Reconstruction of Types and Effects; Ecole des Mines de Paris, MIT Laboratory for Computer Sciences, 8 pages.
Karkowski, et al.; Design of Heterogenous Multi-processor Embedded Systems: Applying Functional Pipelining; 0-8186-8090-3/97; 1997 IEEE; pp. 156-165.
Kim, et al.; Scalable Speculative Parallelization on Commodity Clusters; 2010 43rd Annual IEEE/ACM International Symposium on Microarchitecture; 2010; pp. 3-14.
Le, et al.; IBM Power6 microarchitecture; IBM J. Res & Dev., vol. 51, No. 6, Nov. 2007; pp. 639-662.
Liao, et al.; SUIF Explorer: An Interactive and Interprocedural Parallelizer; PPoPP '99, May 1999, Atlanta, Georgia, USA; pp. 37-48.
Mak, Jonathan; Facilitating program parallelisation; a profiling-based approach; Technical Report No. 796, University of Cambridge, Computer Laboratory, based on dissertation submitted Nov. 2010 for PhD to University of Cambridge, St. John's College; 120 pp.
Milberg, Ken; POWER5 Architecture White Paper; Unix-Linux Solutions LLC; 28 pages.
Nethercote, et al.; Valgrind: A Framework for Heavyweight Dynamic Binary Instrumentation; PLDI '07, Jun. 11-13, 2007, San Diego, California, USA; pp. 89-100.
Nethercote, Nicholas; Dynamic Binary Analysis and Instrumentation or Building Tools is Easy; Dissertation submitted for PhD at the University of Cambridge, Trinity College; 2004; 170 pages.
Ottoni, et al.; Automatic Thread Extraction with Decoupled Software Pipelining; Proceedings of the 38th Annual IEEE/ACM International Symposium on Microarchitecture (MICRO '05); 2005; 12 pages.
PG_MediaWiki; CSC/ECE506 Spring 2011/ch3 ab; North Carolina State University; retrieved from the Internet Apr. 11, 2011; 10 pages.
Raman, et al.; Parallel-State Decoupled Software Pipelining; CGO '08, Apr. 5-8, 2008, Boston, Massachusetts, USA; pp. 114-123.
Rangan, et al.; Decoupled Software Pipelining with the Synchronization Array; Proceeding of the 13th International Conference on Parallel Architecture and Compilation Techniques (PACT'04); 2004; 12 pages.
Rul, et al.; A Profile-based tool for finding pipeline parallelism in sequential programs; Parallel Computing Journal; vol. 36; 2010; pp. 531-551.
Talpin, et al.; Polymorphic Type, Region and Effect Inference, Journal of Functional Programming, vol. 2, No. 2; Cambridge University Press, 1992; 28 pages.
Talpin, et al.; The Type and Effect Discipline; In the proceedings of the 1992 Conference on Logic in Somputer Science; IEEE Computer Society Press, 1992; 12 pages.
Thies, et al.; A Practical Approach to Exploiting Coarse-Grained Pipeline Parallelism in C Programs; 40th IEEE/ACM International Symposium on Microarchitecture; 2007; pp. 356-368.
Tournavitis, et al.; Semi-Automatic Extraction and Exploitation of Hierarchical Pipeline Parallelism Using Profiling Information; PACT '10, Sep. 11-15, 2010, Vienna, Austria; 2010; pp. 377-388.
Tournavitis, et al.; Towards a Holistic Approach to Auto-Parallelization; PLDI '09, Jun. 15-20, 2009, Dublin, Ireland; pp. 177-187.
Vachharajani, et al.; Speculative Decoupled Software Pipelining; 16th International Conference on Parallel Architecture and Compilation Techniques; 2007; pp. 49-59.
Vandierendonck, et al.; The Paralax Infrastructure: Automatic Parallelization with a Helping Hand; PACT '10, Sep. 11-15, 2010, Vienna, Austria; 2010; pp. 389-399.
Varma, et al.; Profiling-based Refactoring Framework for Pipelined Parallelism; IBM India Research Laboratory, New Delhi, India; 2010; 10 pages.
Von Praun, et al.; Implicit Parallelism with Ordered Transactions; PPoPP '07, Mar. 14-17, 2007; San Jose, California, USA; pp. 79-89.
Wolf, Tilman; CommBench Homepage; http://www.ecs.umass.edu/ece/wolf/nsl/software/cb/index.html; retrieved from the Internet Mar. 24, 2011; 4 pages.
Wu, et al.; Compiler-driven Dependence Profiling to Guide Program Parallelization; Programming Models and Tools for Scalable Systems Lab, IBM, Yorktown Heights, NY; Center for Embedded Computer Systems, UCI, Irvine, CA; 16 pages.
Wun, et al.; Design of a Scalable Network Programming Framework; ANCS '08, Nov. 6-7, 2008, San Jose, CA, USA, pp. 10-19.
MediaBench II Benchmark; http://euler.slu.edu/~fritts/mediabench/mb2/index.html; retrieved from the Internet Mar. 24, 2011; 4 pages.
U.S. Appl. No. 13/409,536, filed: Mar. 1, 2012, First Named Inventor: Pradeep Varma.
Lazarescu et al., Dynamic trace-based data dependency analysis for parallelization of C programs, 2012, IEEE pp. 126-131.
Ottoni et al., Global Multi-Threaded Instruction Scheduling, 2007, IEEE, pp. 56-68.
Wu et al., A Novel Speculative Multithreading Parallelization Method in Chip Multiprocessor Systems, 2010, IEEE, pp. 322-326.
Office Action (Mail date Apr. 10, 2014) for U.S. Appl. No. 13/409,536, filed Mar. 1, 2012.

(56) References Cited

OTHER PUBLICATIONS

Amendment (filed Jul. 3, 2014) for U.S. Appl. No. 13/409,536, filed Mar. 1, 2012.
Final Office Action (mailed Apr. 10, 2014) for U.S. Appl. No. 13/446,089, filed Apr. 13, 2012.
Supplemental amendment (filed Jul. 3, 2014) for U.S. Appl. No. 13/446,089, filed Apr. 13, 2012.
Advisory Action (mail date Jun. 17, 2014) for U.S. Appl. No. 13/446,089, filed Apr. 13, 2012.
Notice of Allowance (mailed Aug. 1, 2014) for U.S. Appl. No. 13/446,089, filed Apr. 13, 2012.
Final Amendment (filed Jun. 9, 2014) for U.S. Appl. No. 13/446,089, filed Apr. 13, 2012.
Amendment (filed Feb. 7, 2014) for U.S. Appl. No. 13/446,089, filed Apr. 13, 2012.
Office Action (mailed Nov. 7, 2013) for U.S. Appl. No. 13/446,089, filed Apr. 13, 2012.

\* cited by examiner

```
L101:    // Literal L1 - W void* size pos argno
L102:    // Assumption: the corresponding formal argument
         name is ptr
L103:    void *_tptr = (void*) ptr ;
L104:    for ( int i = 0 ; i < pos ; i ++ )
L105:      ((char *) ptr) ++;
L106:    for ( int i = 0 ; i < size ; i ++ )
L107:      *((char *) ptr) ++ = '0';
L108:    ptr = _tptr;
```

```
L109:    // Literal L2 - R void* size pos argno
L110:    // Assumption: the corresponding formal argument
         name is ptr
L111:    void *_tptr = (void*) ptr;
L112:    for ( int i = 0 ; i < pos ; i++ )
L113:      ((char *) ptr ) ++;
L114:    char *_c = (char *) malloc ( size );
L115:    for ( int i = 0 ; i < size ; i++ )
L116:      *_c++ = *((char *) ptr) ++;
L117:    ptr = _tptr;
```

```
L119:    // Literal L3 - RW FILE* argno
L120:    // Assumption: the corresponding formal argument
         name is fp
L121:    fp->_fileno += 1;
L122:    fp->_fileno -= 1;
```

```
L123:    // Literal L4 - R Scalar argno
L124:    // Literal L5 - W Scalar argno
L125:    //No stub annotation is required.

L126:    // Literal L6 - RW int* argno
L127:    // Assumption: the corresponding formal argument
         name is fd
L128:    int * _tfd = fd;
L129:    *_tfd = *fd;
```

FIG. 3A

```
L130:    //Idiom1: R argno all
L131:    unsigned temp = 0;
L132:    for (T* list = a1; list != NULL; list = list->a3)
L133:        temp += list->a2;
```

```
L134:    //Idiom2 : W argno >depth n
L135:    //int k is some constant
L136:    T* list = a1;
L137:    for (int depth = n; list != NULL && depth > 0;
             list = list->a3)
L138:        depth--;
L139:    for (; list != NULL; list = list->a3)
L140:        list->a2 = k;
```

```
L141:    //Idiom3: R argno <depth m
L142:    unsigned temp = 0;
L143:    T* list = a1;
L144:    for (int depth = m - 1; list != NULL && depth > 0;
             list = list->a3) {
L145:        depth--;
L146:        temp += list->a2;}
```

```
L147:    //Idiom4: W argno >depth n <depth m, where n < m.
L148:    //int k is some constant
L149:    T* list = a1;
L150:    for (int depth = n; list != NULL && depth > 0;
             list = list->a3)
L151:        depth--;
L152:    for (int depth = m - n - 1;
             list != NULL && depth > 0; list = list->a3) {
L153:        depth --;
L154:        list->a2 = k;}
```

FIG. 3B

```
L201:   //standard library call

L202:   size_t fread ( void *buf, size_t size,
        size_t count, FILE *fp )
L203:   W void* size*count 0 1
L204:   R Scalar 2
L205:   R Scalar 3
L206:   RW FILE* 4
```

```
L301:   //stubbed library method for parallelizing
        standard library call of L201-L206

L302:   size_t __stub_fread (void*buf, size_t size,
        size_t count, FILE *fp )
L303:   {
L304:   void *_tptr1 = buf;
L305:   for ( int i = 0 ; i < size*count ; i++ )
L306:   *( ( char * ) buf ) ++ = '0';
L307:   buf = _tptr1;
L308:   fp->_fileno += 1;
L309:   fp->_fileno -= 1;
L310:   fread ( buf, size, count, fp );
L311:   }
```

FIG. 4

CODE PROFILING OF EXECUTABLE LIBRARY FOR PIPELINE PARALLELIZATION

This application is a continuation application claiming priority to Ser. No. 13/446,089, filed Apr. 13, 2012.

BACKGROUND

Examples of conventional program analysis approach for characterizing a program with its types and side effects may be effect systems. In conventional effect systems, functional programs are typically extended with a few referentially-opaque operators are analyzed. In store effects analysis, the initialization, read and write of locations in store are characterized. Algorithms for statically inferencing type and effects of expressions in a program are provided. Store effects are identified vis-a-vis static program regions discerned for them by the static analysis. A region is a set of locations that may be aliases of each other. Example applications of store analysis towards program parallelization (safe scheduling of side-effects) and stack allocation are shown.

BRIEF SUMMARY

According to one embodiment of the present invention, a method for creating a library method stub in source code form corresponding to an original library call in machine-executable form, wherein the original library call appears in sequential code subject to pipeline-parallelization, said method comprises: receiving a library method signature associated with the original library call wherein the library method signature specifies formal arguments of the original library call; receiving at least one idiom sentence that summarizes memory operations performed by the original library call on the formal arguments specified from received library method signature and zero or more parameters that are accessible to the formal arguments; creating the library method stub in a predefined programming language by use of the received library method signature, the received at least one idiom sentence, and a call invoking the original library call; and storing the created library method stub in a stubbed library database (SLDB) such that the stored library method stub is utilized in simulating runtime behavior of the original library call.

According to one embodiment of the present invention, a computer program product comprises a computer readable memory unit that embodies a computer readable program code. The computer readable program code contains instructions that, when run by a processor of a computer system, implement creating a library method stub in source code form corresponding to an original library call in machine-executable form, wherein the original library call appears in sequential code subject to pipeline-parallelization.

According to one embodiment of the present invention, a computer system comprises a processor, a memory coupled to the processor, and a computer readable storage device coupled to the processor, said storage device containing program code configured to be executed by the processor via the memory to implement creating a library method stub in source code form corresponding to an original library call in machine-executable form, wherein the original library call appears in sequential code subject to pipeline-parallelization.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of creating a library method stub in source code form corresponding to an original library call in machine-executable form, wherein the original library call appears in sequential code subject to pipeline-parallelization.

BRIEF DESCRIPTION OF THE SEVERAL VIEWS OF THE DRAWINGS

FIG. 3A is an exemplary listing of a set of idiom-stub mappings utilized by the stub creator, in accordance with the embodiments of the present invention.

FIG. 3B is an exemplary listing of a set of idiom-stub mappings for linked data structures, utilized by the stub creator, in accordance with the embodiments of the present invention.

FIG. 4 is an exemplary listing of a standard library call fread( ) and the corresponding stubbed library method_stub_fread( ) resulting from the stub creator, in accordance with the embodiments of the present invention.

DETAILED DESCRIPTION

The present invention discloses a system and associated method for source-code level profiling of a class of executable library codes. The method utilizes a stub for a library call that has to be profiled. The stub contains enough information to exactly simulate all memory operations that the library call performs on all the arguments that are either passed to the stub as parameters or are accessible to the stub such as global variables. The stub-based library-code profiling method of the present invention cost-effectively enables pipeline parallelization of sequential source codes that invokes the executable library codes.

Figure 1:
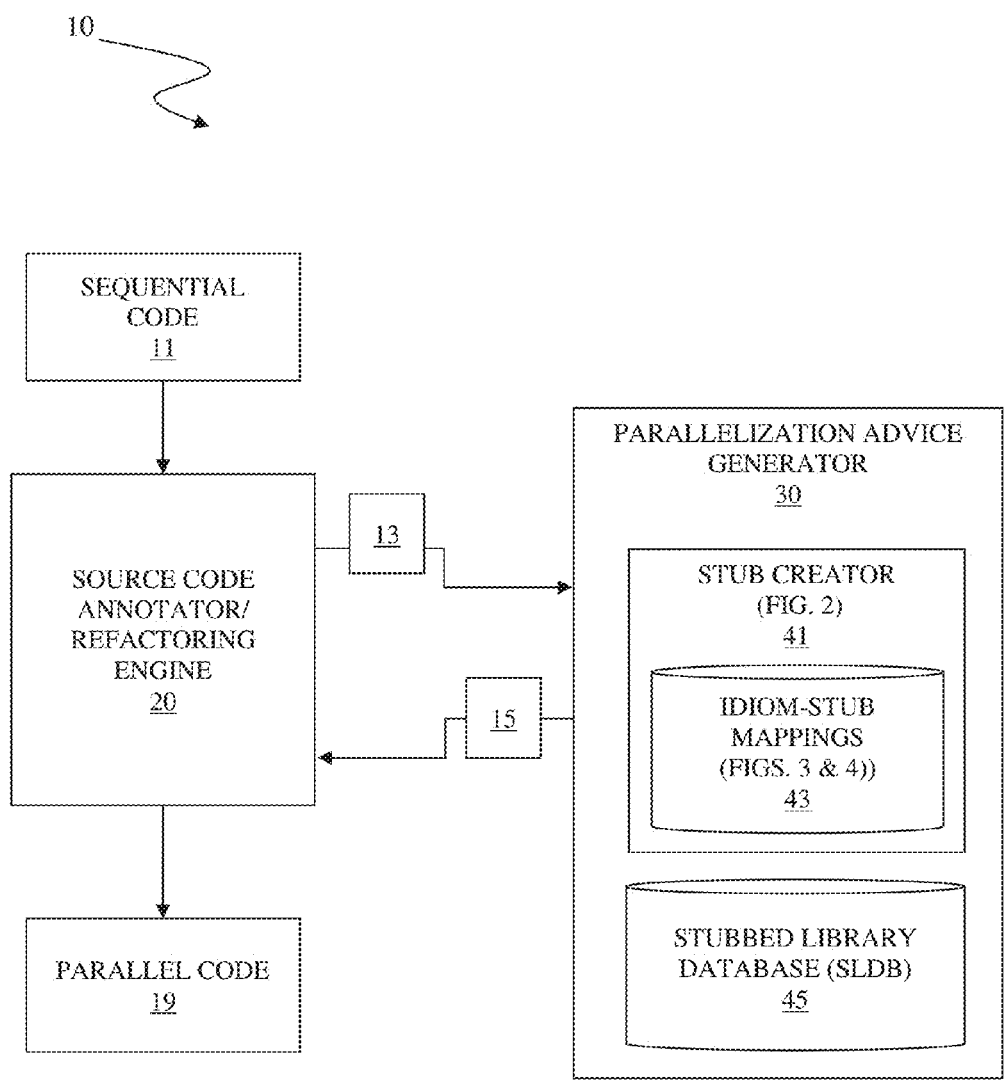
FIG. 1 illustrates a system 10 for pipeline parallelization of sequential code, in accordance with embodiments of the present invention.

FIG. 1 illustrates a system 10 for pipeline parallelization of loops in sequential code 11, in accordance with embodiments of the present invention.

The system 10 comprises a source code annotator/refactoring engine 20 and a parallelization advice generator 30. The source code annotator/refactoring engine 20 receives input of sequential code 11. The source code annotator/refactoring engine 20 identifies and annotates nested loops in the sequential code 11 for dynamic profiling, passes the annotated sequential code 13 to the parallelization advice generator 30. The parallelization advice generator 30 dynamically profiles the annotated sequential code 13, and generates a parallelization advice 15 for each annotated loop. Dynamic profiling tracks runtime behavior of memory locations that are read from or written to during execution of the annotated sequential code 13. The parallelization advice generator 30 maps memory locations back to corresponding variables in the annotated sequential code 13 to generate the parallelization advice 15. The source code annotator/refactoring engine 20 receives the parallelization advice 15 from the parallelization advice generator 30. Subsequently the source code annotator/refactoring engine 20 produces output of parallel code 19 by refactoring the loops in the sequential code 11 based on the received parallelization advice 15. Details of dynamic profiling and task dependency analysis features of the parallelization advice generator 30 and source code annotator/refactoring engine 20 are not covered in this specification.

The sequential code 11 is a typical computer program code that invokes library calls. For purpose of dependency analysis of the sequential code 11, library calls for which source code is not available also need to be profiled. Conventional computer program products only provide executable libraries with library call signatures without source code of the libraries, thus do not enable dependency analysis of libraries for loop parallelization.

A library call accepts variables, which may be values or references, as its arguments. Memory operations on these variables may be classified as a Must Read/Write (R/W) Operation or a May Read/Write Operation. One instance of the Must R/W operation is statically known that all the memory locations pointed to by the arguments will be read/written during the execution of the library call such as standard C library calls of bzero( ), memset( ) etc. The Must R/W operation enables exact simulation of the library call. One instance of the May R/W operation may not be known statically whether a location is assured of being read or written during the call due to complex control flow. The May R/W operation does not enable exact simulation but require approximation.

The sequential code 11 input to the source code annotator/refactoring engine 20 comprises at least one library call in machine-executable form. For correct automatic parallelization of the sequential code 11, said at least one library call for which source code is not available, also needs to be profiled.

The parallelization advice generator 30 comprises a stub creator 41 and a stubbed library database (SLDB) 45. For each library call occurring in the sequential code 11, either a corresponding library method stub is selected from the SLDB 45 if one exists, or a new stub is created by the stub creator 41 by use of idiom-stub mappings 43 if the corresponding library method stub does not exist in the SLDB. The parallelization advice generator 30 dynamically profiles a library method stub instead of the machine-executable library call to achieve accurate profiling results. In this specification, the term "library method stub" is defined as a piece of program code that simulates read/write behaviors of in-scope variables appearing in the original library call and that has no side-effects on the operations inside/outside the original library call. Although there are numerous ways in which combinations reads and writes can be performed and to implement stubs corresponding to respective combinations of memory operations, only a limited number of read-write patterns are practically common. In this specification, the term "idiom" is defined to indicate such limited number of practical read-write pattern. An idiom abstracts a must read and/or must write operation on a variable, The idiom-stub mappings 43 store predefined stub code for these most commonly found idioms. In one embodiment of the idiom-stub mappings 43 shown in FIGS. 3A and 3B infra, the idiom-stub mappings 43 implement all standard C/C++ program library calls set forth in <stdio.h>, <stdlib.h>, and <unistd.h>, such that a library method stub corresponding to each standard library call is used in place of said each standard library call for the purpose of dynamic profiling.

Examples of conventional program analysis approach for characterizing a program with its types and side effects may be effect systems. In conventional effect systems, functional programs are typically extended with a few referentially-opaque operators are analyzed. In store effects analysis, the initialization, read and write of locations in store are characterized. Algorithms for statically inferencing type and effects of expressions in a program are provided. Store effects are identified vis-a-vis static program regions discerned for them by the static analysis. A region is a set of locations that may be aliases of each other. Example applications of store analysis towards program parallelization (safe scheduling of side-effects) and stack allocation are shown.

The embodiments of the present invention is distinctive from above mentioned conventional program analysis approach in applying an effects characterization (store effects) to program libraries whose code is not available for profile-based analysis. This allows whole program analysers to become capable of handling such absent code. Effects are human specified by effect signatures (called idioms) that accurately specify the exact effects carried out on procedure arguments and free variables (abstracting away local state). The effects are specified symbolically, distinctly from type signatures. Such specification identifies effects with location-by-location precision, as opposed to clubbed effects at large region levels. Using standard type signatures and the effect specifications, stub code for binary library functions is generated for profile-based analysis. The embodiments of the present invention handle the International Organization for Standardization and the International Electrotechnical Commission (ISO/IEC) 9899:1999 C programming language standard set forth by Joint Technical Committee 1 (JTC 1) of the ISO/IEC, which requires complex pointer support including pointer arithmetic and function pointers but not higher-order functions. The embodiments of the present invention are utilized for pipeline parallelization of programs.

Figure 2:
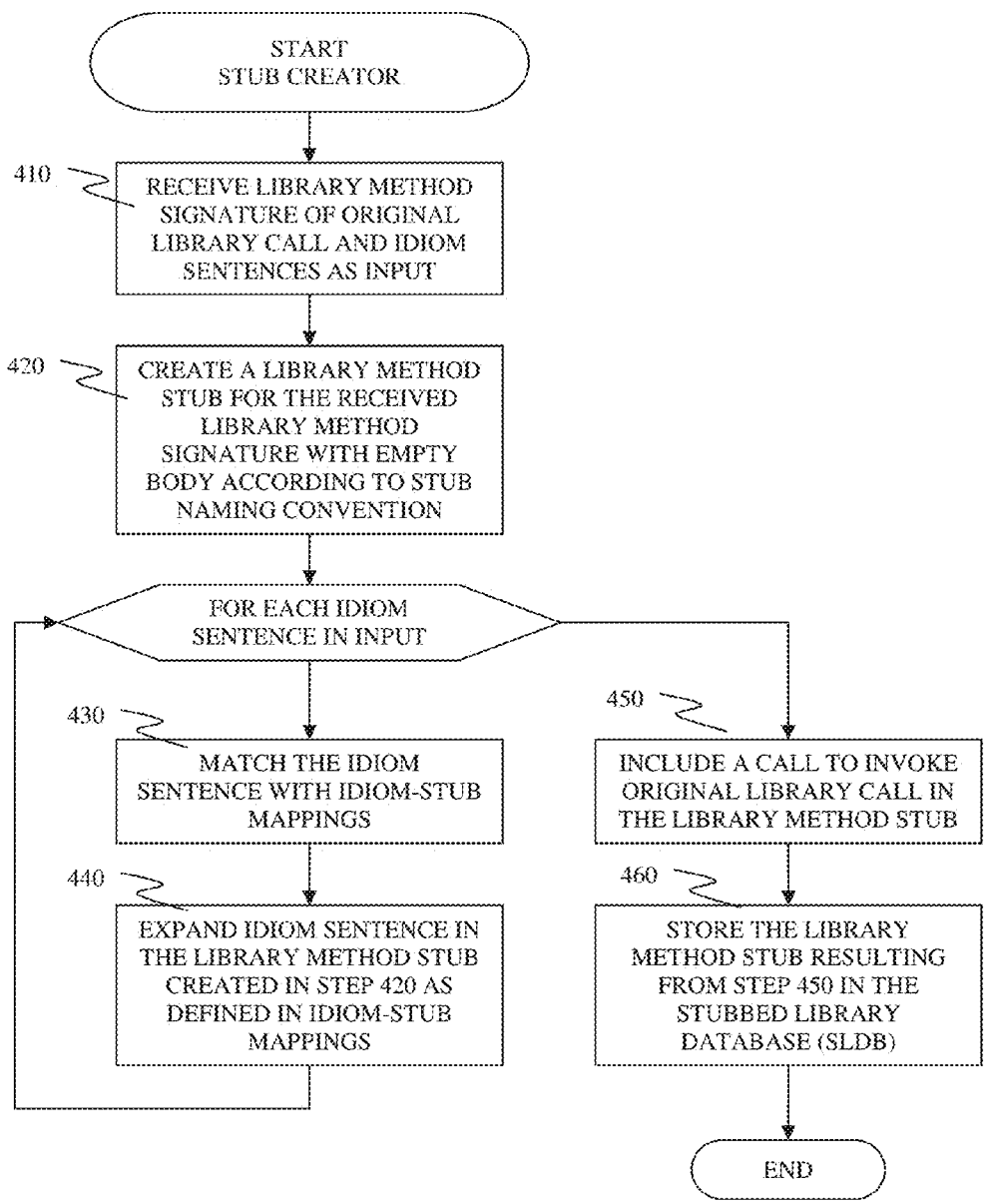
FIG. 2 is a flowchart depicting a method for creating a library method stub corresponding to an original library call, as performed by the stub creator 41 of FIG. 1, in accordance with the embodiments of the present invention.

FIG. 2 is a flowchart depicting a method for creating a library method stub corresponding to an original library call, as performed by the stub creator of FIG. 1 supra, in accordance with the embodiments of the present invention.

In step 410, the stub creator receives library call/method signature and idiom sentences as input. In one embodiment of the present invention, the idiom sentences are expressed by use of sentence definition presented in FIGS. 3A and 3B infra. Then the stub creator proceeds with step 420.

In step 420, the stub creator creates a library method stub for the received library method signature with empty body according to stub naming convention, which add prefix "_stub_" to an original name of the library call, as shown in FIG. 4 infra. Then the stub creator proceeds with step 430.

Steps 430 and 440 are performed as a unit for each idiom sentence in the input received in step 410. Upon processing all idiom sentences in the input, the stub creator proceeds with step 450.

In step 430, the stub creator matches the idiom sentence with idiom-stub mappings stored in the stub creator. Then the stub creator proceeds with step 440.

In step 440, the stub creator expands idiom in the library method stub created in step 420 supra as defined in the idiom-stub mappings pursuant to the match found in step 430 supra. Then the stub creator loops back to step 430 for a next idiom sentence in the input.

In step 450, the stub creator includes a call to invoke the original library call in the library method stub. Then the stub creator proceeds with step 460.

In step 460, the stub creator stores the library method stub resulting from step 450 in the stubbed library database (SLDB) such that the library method stub is utilized by the parallelization advice generator in generating the parallelization advice. Then the stub creator terminates processing the input from step 410.

FIG. 3A is an exemplary listing of a set of idiom stub mappings for standard library calls utilized by the stub creator, in accordance with the embodiments of the present invention.

In this specification, terms "library call", "library method", "standard library calls", and "standard library methods" are used interchangeably to represent standardized method of programming language. A library call accepts variables as arguments. A variable may indicate a scalar value or a reference to a memory location. Memory operations on these variables are selected from {W, R}, wherein W is a must-write operation that statically writes all memory locations pointed to the arguments while performing the library call, and wherein R is a must-read operation that statically reads all memory locations pointed to the arguments while performing the library call. Examples of W memory operation may be, inter alia, bzero( ), memset( ) of standard C library calls.

In this specification, the term "idiom" is defined as an abstraction of a memory operation on a variable, wherein the memory operations is either "read" or "write". An idiom is represented by elements comprising W, R, size, pos, and argno, wherein W denotes a must write operation on a variable, wherein R denotes a must read operation on a variable, wherein size denotes the number of memory locations that are applicable for memory operations selected from {W, R}, size being represented in either a scalar value or a mathematical function of integer arguments, wherein pos denotes a location offset from where the memory location of the variable are read and/or written by the library call, and wherein argno denotes position of the argument in the library call signature for which the idiom applies. For example, a first idiom stating "size number of locations, starting at offset pos, are read for an argument of type T* occurring at position 1 in the list of method call arguments", where T is any standard or user defined data type, is represented as, "R void* size pos 1".

A sentence S for idioms is defined as:
S::=S1|S2|S1 '\n' S2|c? S1:S2
S1::=l1|l2|l3|l4|l5|l6
S2::=l1|l2|l3|l4|l5|l6
c::=a Boolean expression on arguments
l1::=W void* size pos argno
l2::=R void* size pos argno
l3::=RW FILE* argno
l4::=R Scalar argno
l5::=W Scalar argno
l6::=RW int* argno,
wherein literals l1, l2 . . . l6 denote basic idioms of the sentence S, wherein '\n' is a line feed character, and wherein "c? S1:S2" represents a conditional statement of "if c then S1 else S2", wherein c is determined to be a truth value selected from {True, False}. The sentence S provides rules for composition of literals to produce a complex idiom.

According to idiom definition supra, lines L101 through L108 represent a stub code mapping for the first literal l1 in the sequential code, lines L109 through L117 represent a stub code mapping for the second literal l2 in the sequential code, lines L119 through L122 represent a stub code mapping for the third literal l3 in the sequential code, lines L123 through L125 represent a null stub code mapping for the fourth and fifth literal l4 and l5 in the sequential code, and lines L126 through L129 represent a stub code mapping for the sixth literal l6 in the sequential code, respectively.

FIG. 3B is an exemplary listing of a set of idiom-stub mappings for linked data structures, utilized by the stub creator, in accordance with the embodiments of the present invention.

In the same embodiment as in FIG. 3A supra implemented for C programming language, types can be represented using the following simplified syntax that processes away typedefs, type qualifiers, storage class specifiers, signed/unsigned specifiers, and separates the types syntax from C expressions syntax:

type ::= typename | array of [ [n | * ] ] type | pointer to type |
   function of ([ type,]* type [, ...] ) returning type |
   void | arithmetic-type |
   ( struct | union ) [id] { (type ( id | [id ] : c))+ }
typedef ::= typename = type wherein [ . . . ] encloses an optional entity, ( . . . ) groups its contents, * represents Kleene closure e.g. [ . . . ]*, and | separates alternatives. Type qualifiers and specifiers such as signed, const, volatile do not affect the size, alignment, or layout of types, whose access is the subject of analysis of our present work. Arithmetic-types are the range of integer/float/char types that can be defined in C, with the _complex type getting treated as an array of two float types. Similarly, enumeration types are treated as scalar arithmetic types from a layout perspective.

The stub creator treats each type as a named type for simplicity, with a left term of each type definition being a name and a right term declaring the type, possibly recursively. The type name is interesting only for recursive definitions making up a variety of linked data structures.

In this embodiment, the stub creator attempts to specify read and write regions of each data structure argument using idioms such as, inter alia, R argno all; W argno>depth n; R argno<depth m; W argno>depth n<depth m, where n<m, etc. For a linked list argument, these idioms read respectively as the entire linked list is a read region; the linked list after the first n elements is a write region; the linked list before the m-th element is a read region; and the linked list between the n-th and m-th elements is a write region. Specifications n, m is selected from a constant, or another argument of the stub function. Based on the type specification of each argument type available presented supra, and on idioms of FIG. 3B, the stub creator generates respective sequential function accessing the specified memory. FIG. 3B shows exemplary code generated for various list idioms, for an argument a1 of type T* where, T=struct {int a2; T*a3;}.

According to idiom definition supra, lines L130 through L133 represent a stub code mapping for a first idiom Idiom1 in the sequential code, lines L134 through L140 represent a stub code mapping for the second idiom Idiom2 in the sequential code, lines L141 through L146 represent a stub code mapping for the third idiom Idiom3 in the sequential code, and lines L147 through L154 represent a stub code mapping for the fourth idiom Idiom4 in the sequential code, respectively. FIG. 3B represents one embodiment of list traversal algorithms. For graphs more complicated than lists such as binary trees, stub generation is similarly a type-driven graph traversal exercise, accessing the memory regions specified by the idioms. Such traversal and access can be carried out analogous to the list cases shown in FIG. 3B.

FIG. 4 is an exemplary listing of the standard library call fread( ) and its corresponding library method stub_stub_fread( ) resulting from performing the stub creator, in accordance with the embodiments of the present invention.

Line L202 is a method signature for the standard C library call fread( ). Lines L203 through L206 are input idiom sentences to the stub creator for the standard C library call fread( ).

Lines L301 through L311 are a library method stub_stub_fread( ) corresponding to the standard C library call fread( ) of lines L201 through L206, as generated by the stub creator, as resulting after performing the method of FIG. 2 supra.

Figure 5:
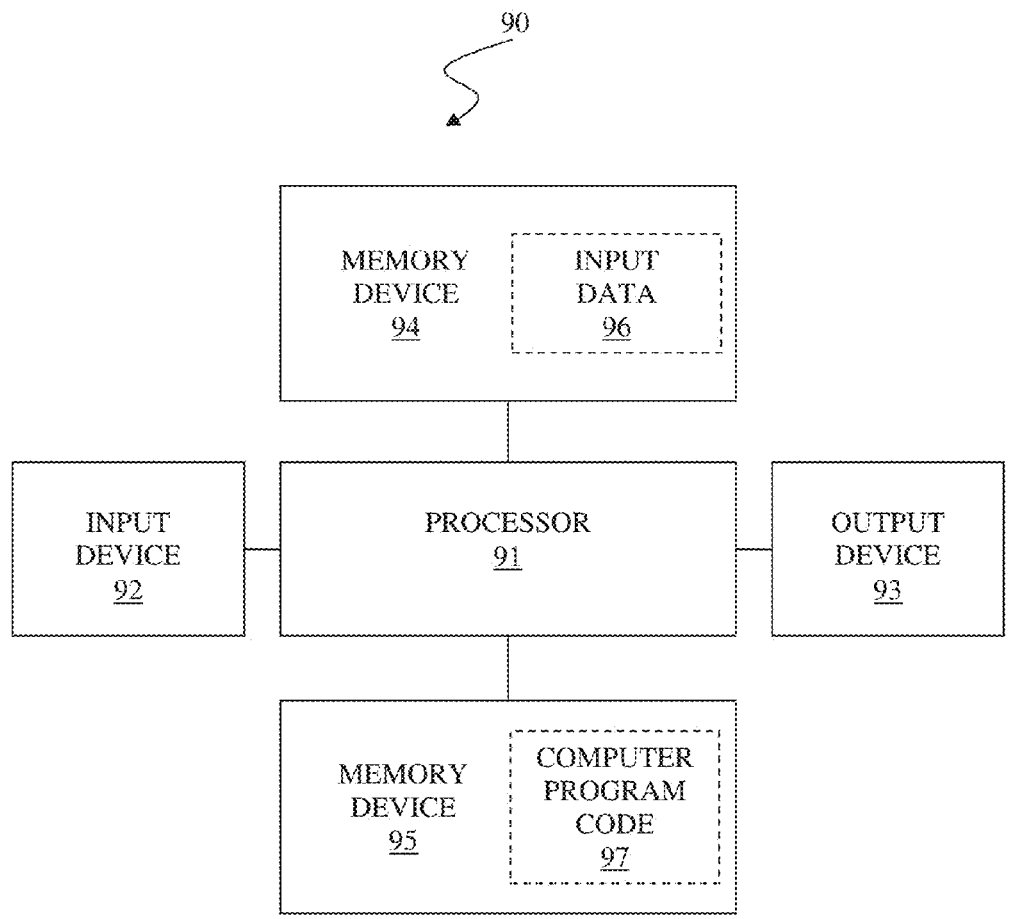
FIG. 5 illustrates a computer system used for creating a library method stub corresponding to an original library call, in accordance with the embodiments of the present invention.

FIG. 5 illustrates a computer system used for creating a library method stub corresponding to an original library call, in accordance with the embodiments of the present invention.

The computer system 90 comprises a processor 91, an input device 92 coupled to the processor 91, an output device 93 coupled to the processor 91, and memory devices 94 and 95 each coupled to the processor 91. In this specification, the computer system 90 represents any type of programmable data processing apparatus.

The input device 92 is utilized to receive input data 96 into the computer system 90. The input device 92 may be, inter alia, a keyboard, a mouse, a keypad, a touch screen, a scanner, a voice recognition device, a sensor, a network interface card (NIC), a Voice/video over Internet Protocol (VOIP) adapter, a wireless adapter, a telephone adapter, a dedicated circuit adapter, etc. The output device 93 is utilized to communicate results generated by the computer program code 97 to a user of the computer system 90. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

Any of the components of the present invention can be deployed, managed, serviced, etc. by a service provider that offers to deploy or integrate computing infrastructure with respect to a process for creating a library method stub corresponding to an original library call of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method creating a library method stub corresponding to an original library call.

In another embodiment, the invention provides a method that performs the process steps of the invention on a subscription, advertising and/or fee basis. That is, a service provider, such as a Solution Integrator, can offer to create, maintain, support, etc., a process for creating a library method stub corresponding to an original library call of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable hardware storage device. In this specification, the term "memory device" 94, 95 represent a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any physically tangible medium that can contain, or store a program for use by or in connection with an instruction execution system, apparatus, or device.

Computer program code 97 for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer program code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer program code" 97 in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for creating a library method stub in source code form corresponding to an original library call in machine-executable form, said method comprising:
    creating, by a computer processor, the library method stub in a predefined programming language by use of a library method signature associated with the original library call, at least one idiom sentence, and a call invoking the original library call, wherein said creating the library method stub comprises composing source code of the library method stub by matching the at least one idiom sentence with idiom-stub mappings predefined for each basic idiom of at least one basic idiom, wherein the original library call appears in sequential code, wherein the library method signature specifies formal arguments of the original library call, wherein the at least one idiom sentence summarizes memory operations performed by the original library call on the formal arguments, and wherein a sentence S of the at least one basic idiom provides at least one rule for generating a composition of literals to generate a complex idiom; and
    said processor storing the created library method stub in a database.

2. The method of claim 1, said method further comprising:
    said processor annotating the sequential code for parallelization resulting in creating the library method signature and the at least one idiom sentence.

3. The method of claim 1, said method further comprising:
    said processor modifying the sequential code by replacing the original library call in the sequential code with a respective call for the library method stub such that the modified sequential code is utilized in profiling the sequential code for data dependency analysis to enable pipeline-parallelization of the sequential code.

4. The method of claim 1, said creating comprising:
    said processor concluding the source code with the call invoking the original library call.

5. The method of claim 1, wherein the sentence S of the at least one basic idiom is selected from a group consisting of {S1, S1 '\n' S2, c? S1:S2}, wherein S1 is a first instance of S, wherein S2 is a second instance of S, wherein both S1 and S2 is selected from a group consisting of {l1, l2, l3, l4, l5, l6}, wherein '\n' is a line feed character, wherein "c? S1:S2" represents a conditional statement of "if c then S1 else S2", wherein c results in a Boolean truth value selected from {True, False}, wherein a first literal l1 of the at least one basic idiom is defined as "W void* size pos argno", wherein a second literal l2 of the at least one basic idiom is defined as "R void* size pos argno", wherein a third literal l3 of the at least one basic idiom is defined as "RW FILE* argno", wherein a fourth literal l4 of the at least one basic idiom is defined as "R Scalar argno", wherein a fifth literal l5 of the at least one basic idiom is defined as "W Scalar argno", wherein a sixth literal l6 of the at least one basic idiom is defined as "RW int* argno".

6. The method of claim 1, said method further comprising:
    providing at least one support service for at least one of creating, integrating, hosting, maintaining, and deploying computer-readable program code in the computer system, said program code being executed by the processor to implement said creating and said storing.

7. A computer program product comprising a computer readable hardware storage device having computer readable program code stored therein, said storage device not being a transitory signal, said computer readable program code configured to be executed by a processor of a computer system to perform a method for creating a library method stub in source code form corresponding to an original library call in machine-executable form, said method comprising:
    said processor creating the library method stub in a predefined programming language by use of a library method signature associated with the original library call, at least one idiom sentence, and a call invoking the original library call, wherein said creating the library method stub comprises composing source code of the library method stub by matching the at least one idiom sentence with idiom-stub mappings predefined for each basic idiom of at least one basic idiom, wherein the original library call appears in sequential code, wherein the library method signature specifies formal arguments of the original library call, wherein the at least one idiom sentence summarizes memory operations performed by the original library call on the formal arguments, and wherein a sentence S of the at least one basic idiom provides at least one rule for generating a composition of literals to generate a complex idiom; and said processor storing the created library method stub in a database.

8. The computer program product of claim 7, said method further comprising:
said processor annotating the sequential code for parallelization resulting in creating the library method signature and the at least one idiom sentence.

9. The computer program product of claim 7, said method further comprising:
said processor modifying the sequential code by replacing the original library call in the sequential code with a respective call for the library method stub such that the modified sequential code is utilized in profiling the sequential code for data dependency analysis to enable pipeline-parallelization of the sequential code.

10. The computer program product of claim 7, said creating comprising:
said processor concluding the source code with the call invoking the original library call.

11. The computer program product of claim 7, wherein the sentence S of the at least one basic idiom is selected from a group consisting of {S1, S1 '\n' S2, c? S1:S2}, wherein S1 is a first instance of S, wherein S2 is a second instance of S, wherein both S1 and S2 is selected from a group consisting of {l1, l2, l3, l4, l5, l6}, wherein '\n' is a line feed character, wherein "c? S1:S2" represents a conditional statement of "if c then S1 else S2", wherein c results in a Boolean truth value selected from {True, False}, wherein a first literal l1 of the at least one basic idiom is defined as "W void* size pos argno", wherein a second literal l2 of the at least one basic idiom is defined as "R void* size pos argno", wherein a third literal l3 of the at least one basic idiom is defined as "RW FILE* argno", wherein a fourth literal l4 of the at least one basic idiom is defined as "R Scalar argno", wherein a fifth literal l5 of the at least one basic idiom is defined as "W Scalar argno", wherein a sixth literal l6 of the at least one basic idiom is defined as "RW int* argno".

12. A computer system comprising a processor, a memory coupled to the processor, and a computer readable storage device coupled to the processor, said storage device not being a transitory signal, said storage device containing program code configured to be executed by the processor via the memory to implement a method for creating a library method stub in source code form corresponding to an original library call in machine-executable form, said method comprising:
said processor creating the library method stub in a predefined programming language by use of a library method signature associated with the original library call, at least one idiom sentence, and a call invoking the original library call, wherein said creating the library method stub comprises composing source code of the library method stub by matching the at least one idiom sentence with idiom-stub mappings predefined for each basic idiom of at least one basic idiom, wherein the original library call appears in sequential code, wherein the library method signature specifies formal arguments of the original library call, wherein the at least one idiom sentence summarizes memory operations performed by the original library call on the formal arguments, and wherein a sentence S of the at least one basic idiom provides at least one rule for generating a composition of literals to generate a complex idiom; and said processor storing the created library method stub in a database.

13. The computer system of claim 12, said method further comprising:
said processor annotating the sequential code for parallelization resulting in creating the library method signature and the at least one idiom sentence.

14. The computer system of claim 12, said method further comprising:
said processor modifying the sequential code by replacing the original library call in the sequential code with a respective call for the library method stub such that the modified sequential code is utilized in profiling the sequential code for data dependency analysis to enable pipeline-parallelization of the sequential code.

15. The computer system of claim 12, said creating comprising:
said processor concluding the source code with the call invoking the original library call.

16. The computer system of claim 12, wherein the sentence S of the at least one basic idiom is selected from a group consisting of {S1, S1 '\n' S2, c? S1:S2}, wherein S1 is a first instance of S, wherein S2 is a second instance of S, wherein both S1 and S2 is selected from a group consisting of {l1, l2, l3, l4, l5, l6}, wherein '\n' is a line feed character, wherein "c? S1:S2" represents a conditional statement of "if c then S1 else S2", wherein c results in a Boolean truth value selected from {True, False}, wherein a first literal l1 of the at least one basic idiom is defined as "W void* size pos argno", wherein a second literal l2 of the at least one basic idiom is defined as "R void* size pos argno", wherein a third literal l3 of the at least one basic idiom is defined as "RW FILE* argno", wherein a fourth literal l4 of the at least one basic idiom is defined as "R Scalar argno", wherein a fifth literal l5 of the at least one basic idiom is defined as "W Scalar argno", wherein a sixth literal l6 of the at least one basic idiom is defined as "RW int* argno".

* * * * *